US011945963B2

(12) United States Patent
Alvarez-Alvarez et al.

(10) Patent No.: US 11,945,963 B2
(45) Date of Patent: Apr. 2, 2024

(54) COATED NON-CONDUCTIVE SUBSTRATE

(71) Applicant: ArcelorMittal, Luxembourg (LU)

(72) Inventors: Abel Alvarez-Alvarez, Asturias (ES); Oscar Perez Vidal, Asturias (ES); Carlos Javier Rodriguez Martinez, Asturias (ES); Jose Paulino Fernandez Alvarez, Asturias (ES); Carlos Suarez Garcia, Asturias (ES); Hugo Blanco Iglesias, La Fresneda (Siero) Asturias (ES); Jorge Melconmiguel, Asturias (ES)

(73) Assignee: ArcelorMittal, Luxembourg (LU)

( * ) Notice: Subject to any disclaimer, the term of this patent is extended or adjusted under 35 U.S.C. 154(b) by 630 days.

(21) Appl. No.: 17/058,106

(22) PCT Filed: Jun. 11, 2019

(86) PCT No.: PCT/IB2019/054844
§ 371 (c)(1),
(2) Date: Nov. 23, 2020

(87) PCT Pub. No.: WO2019/239302
PCT Pub. Date: Dec. 19, 2019

(65) Prior Publication Data
US 2021/0206991 A1 Jul. 8, 2021

(30) Foreign Application Priority Data
Jun. 15, 2018 (WO) .................. PCT/IB2018/054427

(51) Int. Cl.
*C09D 163/00* (2006.01)
*G01B 7/16* (2006.01)
(Continued)

(52) U.S. Cl.
CPC ............ *C09D 163/00* (2013.01); *G01B 7/18* (2013.01); *G01N 27/125* (2013.01); *H01M 10/4228* (2013.01); *C08K 3/042* (2017.05)

(58) Field of Classification Search
CPC .......... C09D 163/00; C09D 7/61; C09D 7/70; C09D 5/00; C09D 5/002; G01B 7/18;
(Continued)

(56) References Cited

U.S. PATENT DOCUMENTS 6,648,552 B1 11/2003 Smith et al.
2014/0291733 A1 10/2014 Lee et al.
(Continued)

FOREIGN PATENT DOCUMENTS

JP 2013035966 A 2/2013
JP 2015040211 A 3/2015
(Continued)

OTHER PUBLICATIONS

International Search Report of PCT/IB2019/054844, dated Jan. 10, 2019.

*Primary Examiner* — Karen Kusumakar
*Assistant Examiner* — Adam S Bowen
(74) *Attorney, Agent, or Firm* — Davidson, Davidson & Kappel, LLC

(57) ABSTRACT

A non-conductive substrate being at least partially coated with a paint including reduced graphene oxide and a thermosetting polymer, the non-conductive substrate being directly coated by the paint, a method for the manufacture of this coated non-conductive substrate, methods for detecting leaks or strain deformation and the uses of said coated non-conductive substrate.

21 Claims, 2 Drawing Sheets

(51) Int. Cl.
*G01N 27/12* (2006.01)
*H01M 10/42* (2006.01)
*C08K 3/04* (2006.01)

(58) Field of Classification Search
CPC . G01N 27/125; H01M 10/4228; C08K 3/042; Y02E 60/10
See application file for complete search history.

(56) References Cited

U.S. PATENT DOCUMENTS

| | | | |
|---|---|---|---|
| 2014/0313562 A1* | 10/2014 | Ruoff | H01B 5/14 428/457 |
| 2015/0218392 A1 | 8/2015 | Crain et al. | |
| 2016/0060120 A1 | 3/2016 | Hu et al. | |
| 2016/0272575 A1 | 9/2016 | Zheng et al. | |
| 2017/0138804 A1 | 5/2017 | Lebental et al. | |
| 2017/0275435 A1 | 10/2017 | Shiozaki et al. | |
| 2018/0052134 A1* | 2/2018 | Kawde | G01N 27/48 |

FOREIGN PATENT DOCUMENTS

| | | |
|---|---|---|
| JP | 2016500714 A | 1/2016 |
| JP | 2017178979 A | 10/2017 |
| JP | 2017218373 A | 12/2017 |
| KR | 20170071678 | 6/2017 |
| WO | WO2009/123771 | 10/2009 |
| WO | WO 2014/070346 A1 | 5/2014 |
| WO | WO2017/132734 | 8/2017 |
| WO | WO2017/177269 | 10/2017 |
| WO | WO2018/178845 | 10/2018 |
| WO | WO2019/220177 A1 | 11/2019 |
| WO | WO2019/224579 A1 | 11/2019 |
| WO | WO2019/239304 A1 | 12/2019 |

\* cited by examiner

COATED NON-CONDUCTIVE SUBSTRATE

The present invention relates to a non-conductive substrate being at least partially coated with a paint comprising reduced graphene oxide and a thermosetting polymer, the non-conductive substrate being directly coated by the paint, a method for the manufacture of this coated non-conductive substrate, methods for detecting leak and strain deformation. It is particularly well suited for the mining industry, electronic industry, plastic piping systems, clothing industry and engineering plastics used in the automotive or aerospace industry.

BACKGROUND

It is known to use geomembranes, geotextiles or geosynthetic clay liners (GCL) as water barrier layers used when building water retention facilities (e.g. dams and ponds) or water guidance facilities (e.g. drainage and canals). These textiles can be deployed on a large scale and may potentially cover many thousands of square meters. Geotextiles can serve many purposes, but they are predominately not in themselves a barrier to water ingress. Where water barrier properties are required an additional waterproof layer is typically used. Geosynthetic clay liners (GCL) can be waterproof plastic membranes and/or composites containing clays. Clay lining is the traditional method of waterproofing water retention facilities. These offer improved performance over traditional clay earthworks and are used in reservoirs and landfills. Geomembranes are very low permeability synthetic membrane liners that are used with any geotechnical engineering related material so as to control fluid (or gas) migration in a human-made project, structure, or system.

A GCL typically comprises at least three layers: i.e. a layer of clay sandwiched between two geosynthetic layers. The two geosynthetic layers used to sandwich the clay can be any combination of woven or non-woven geotextile, geogrids, geonets or geomembranes. For example, the structure may comprise a strengthening or backing layer of geogrid or geonet and a non-woven geotextile. The strengthening layer can be a woven textile or net. The clay is often bentonite and may contain additives, such as polymeric binders and or stabilizers.

Water barrier layers, such as pond liners and GCL, usually require protection against damage to ensure they retain their barrier properties. A small hole in the liner can result in significant water leakage, especially over time. In some cases, for example in containing mining waste where the water is contaminated and is being retained or directed to protect the environment, small amounts of leakage can have a significant effect and can cause substantial environmental harm, and potentially incur large costs to rectify. In such applications the integrity of the liner is critical, as is the ability to determine and monitor that integrity at all times.

Inspection of barrier integrity can include electrical inspection, where a voltage is applied to the surface of the insulating barrier and under the right conditions a circuit can be formed through any defects in the barrier material. For a circuit to be formed, an electrical conduction mechanism on the opposite side of the barrier to which the voltage is applied is required. Where an electrolyte, even a very weak one, is present under the barrier, sufficient current can be carried to form a circuit through the defect and to the inspection equipment. For example, clay is often a sufficient electrolyte due to its salt and water content.

To assist with the formation of a conducive pathway water can be used as part of the structure, to facilitate the inspection process. In cases where the clay is dry it does not function as an electrolyte, so the conductive inspection mechanism becomes unreliable. In cases where multiple layers of insulator are present in the barrier layer no reliable mechanism for forming a circuit exists.

The patent application publication WO2017/132734 discloses an electrically conductive textile incorporating graphene to detect leakage. Incorporation of graphene into a textile can be achieved by different methods including mixing the graphene into the polymer prior to forming the fiber. It is also possible to coat fibers or a textile with graphene to make the conductive textile. The graphene can be present as a powder or as a dispersion in a fluid to facilitate dispersion of the graphene in the polymer. Suitable methods of incorporation of graphene into the polymer include: Melt-compounding of graphene into the polymer; in-situ polymerization of the polymer with the graphene, and; solution blending. In the Examples, graphene dispersed in ethanol, xylene, water or acrylic was used to coat the geotextiles. Graphene oxide dispersed in water was also deposited on the geotextile. It was followed by the reduction of graphene oxide into graphene using citric acid.

The patent application publication WO2017/177269 discloses a geosynthetic clay liner incorporating an electrically conductive textile to detect leak. Said textile may incorporate conductive fibers or be coated with a conductive coating. The conductive fibers preferably contain graphene, or are coated with graphene, or alternatively the textile itself may be coated with graphene. Incorporation of graphene into a textile can be achieved by many methods including mixing the graphene into the polymer prior to forming the fiber. It is also possible to coat fibers or a textile with graphene to make the conductive textile. The graphene can be present as a powder or as a dispersion in a fluid to facilitate dispersion of the graphene in the polymer. Methods of incorporation of graphene into the polymer can include: Melt-compounding of graphene into the polymer; in-situ polymerization of the polymer with the graphene, and; solution blending.

Melt-compounding of graphene into the polymer; in-situ polymerization of the polymer with the graphene, and; solution blending are techniques used for thermoplastic polymers.

However, in both patent application publications WO2017/177269 and WO2017/132734, whether graphene or graphene oxide is dispersed into solvent such as xylene, ethanol, water before being deposited on the geotextile allowing a bad adherence of graphene on the geotextile; whether graphene is dispersed in acrylic before being deposited and melt on the geotextile resulting in a high risk of bad dispersion of the graphene since thermoplastics are known to be viscous polymers. The bad adherence and bad dispersion can result in a poor detection quality of leaks.

Additionally, there is a need to evaluate the strain deformation of the non-conductive substrates geomembranes, geotextiles or GCL. Indeed, very sensitive strain sensing devices are greatly needed for monitoring a state of such products for early detecting a defect that occurs in an extreme situation such as a natural disaster (e.g. earthquake) or in a usual situation such as wear.

SUMMARY OF THE INVENTION

An object of the invention is to improve the quality of the leak detection of non-conductive substrates. Additionally or alternately, another object is to detect the strain deformation of said non-conductive substrates to among others improve the life time of the substrates.

The present invention provides a non-conductive substrate being at least partially coated on at least one side with a paint comprising reduced graphene oxide having a surface area below 300 $m^2 \cdot gr^{-1}$ and at least one thermosetting polymer, the non-conductive substrate being directly coated by the paint.

The invention also covers a method for the manufacture of the non-conductive substrate being at least partially coated.

The invention also covers a method for detecting a leak with the non-conductive substrate being at least partially coated.

The invention also covers a method for detecting a strain deformation with the non-conductive substrate being at least partially coated.

Finally, the invention covers the use of a non-conductive substrate being at least partially coated.

The following terms are defined:
Reduced graphene oxide means graphene oxide that has been reduced. The reduced graphene oxide comprises one or a few layer(s) of graphene having some oxygen functional groups including ketone groups, carboxyl groups, epoxy groups and hydroxyl groups and
Biopolymers are polymers produced by living organisms; in other words, they are polymeric biomolecules. Biopolymers contain monomeric units that are covalently bonded to form larger structures.

BRIEF DESCRIPTION OF THE DRAWINGS

Other characteristics and advantages of the invention will become apparent from the following detailed description of the invention.

To illustrate the invention, various embodiments and trials of non-limiting examples will be described, particularly with reference to the following Figures.

DETAILED DESCRIPTION

The invention relates to a non-conductive substrate being at least partially coated on at least one side with a paint comprising reduced graphene oxide having a surface area below 300 $m^2 \cdot gr^{-1}$ and at least one thermosetting polymer, the non-conductive substrate being directly coated by the paint.

Without willing to be bound by any theory, it seems that the paint including the reduced graphene oxide having a surface area below 300 $m^2 \cdot gr^{-1}$ and the thermosetting polymer well adheres on the non-conductive substrate increasing the lifetime of the coated non-conductive substrate. Indeed, it is believed that thanks to the thermosetting polymer, the reduced graphene oxide is highly dispersed in the paint leading to an improvement of the detection quality. Finally, the paint deposited on the non-conductive substrate is an easy and simple system allowing the detection of leak and strain deformation.

Preferably, the reduced graphene oxide has a surface area below 290 $m^2 \cdot gr^{-1}$. Preferably, the reduced graphene oxide has a surface area above 200 $m^2 \cdot gr^{-1}$. When the surface area is equal or above to 300 $m^2 \cdot gr^{-1}$, it seems that the quality of the leak detection of non-conductive substrates decreases since the paint is too sensitive and therefore, the background noise is also detected.

The reduced graphene oxide can be produced from kish graphite as disclosed in the patent applications PCT/IB2017/000348 published as WO2018/178845 A or PCT/IB2018/053416 published as WO2019/220177 A1. It can also be produced from electrode scraps as disclosed in PCT/IB2018/053643 published as WO2019/224579 A1.

Preferably, the non-conductive substrate is coated on both sides.

In a preferred embodiment, the coated non-conductive substrate is covered by a protective layer. The protective layer can be made of thermosetting polymers. In this case, the coated non-conductive substrate is protected against corrosion, etc.

Preferably, the lateral size of the reduced graphene oxide is between 1 and 80 μm, more preferably between 40 and 80 μm and advantageously between 60 and 80 μm.

Preferably, the weight percentage of oxygen in the reduced graphene oxide is between 2 and 20% and preferably between 2 and 10%. Indeed, without willing to be bound by any theory, it is believed that the percentage of oxygen plays a role in the conductivity and electrical resistance of the paint.

Preferably, the reduced graphene oxide is not functionalized by a biopolymer. Indeed, without willing to be bound by any theory, it is believed that the biopolymer can decrease the sensitivity of the leak and strain deformation detection.

Figure 1:
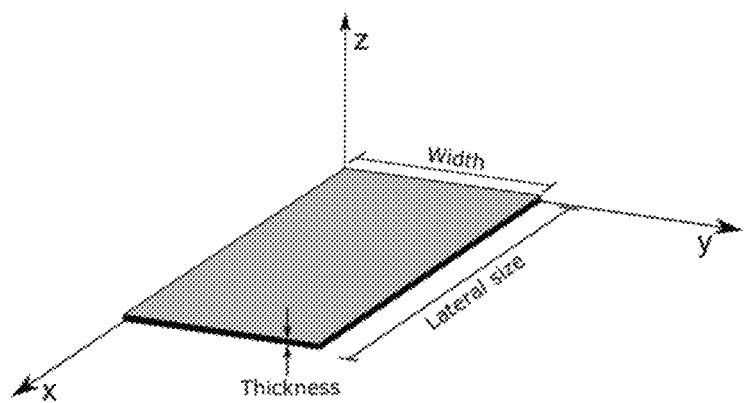
FIG. 1 illustrates an example of one nanoplatelet of reduced graphene oxide according to the present invention.
Figure 2:
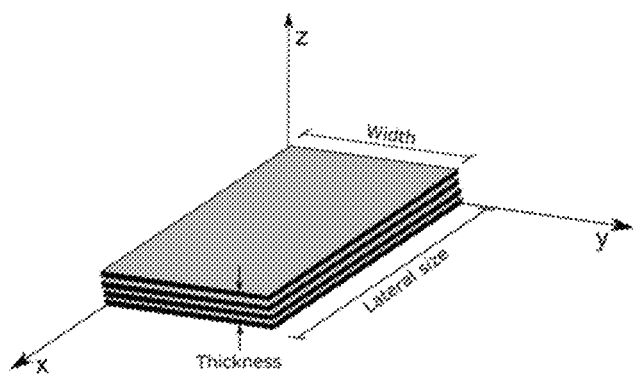
FIG. 2 illustrates an example of a few nanoplatelets of reduced graphene oxide according to the present invention.

Preferably, the reduced graphene oxide is in a form of one or more nanoplatelets. Indeed, without willing to be bound by any theory, it is believed that the form of the reduced graphene oxide can play a role in the detection since it seems that the nanoplatelets can easily form a path in the paint wherein the electricity runs. FIG. 1 illustrates an example of one nanoplatelet of reduced graphene oxide. The lateral size means the highest length of the layer through the X axis, the thickness means the height of the layer through the Z axis and the width of the nanoplatelet is illustrated through the Y axis. FIG. 2 illustrates an example of a few nanoplatelets of reduced graphene oxide.

Advantageously, the thickness of the paint is between below 2 mm and preferably between 50 and 500 μm.

Preferably, the concentration of the reduced graphene oxide in the paint is between 0.05 and 10% by weight, preferably between 0.05 and 7% by weight and advantageously between 0.5 and 4% by weight. Indeed, without willing to be bound by any theory, it seems that having the reduced graphene oxide in the above concentration can further improve the detection sensitivity in the case of strain because in that range the conductivity of the network of nanoparticles formed inside the thermosetting resin is more sensitive to deformations allowing to detect smaller strains.

Preferably, the paint does not comprise a thermoplastic polymer. In particular, the paint does not comprise acrylic polymer. Indeed, it is believed that the thermoplastic improves the viscosity of the paint leading to a bad dispersion of reduced graphene oxide and therefore a poor quality of the coated non-conductive substrate.

Advantageously, the thermosetting polymer is chosen from among: epoxy resin, Polyester resin, Polyurethanes, Polyurea/polyurethane, Vulcanized rubber, Urea-formaldehyde, Melamine resin, Benzoxazines, Polyimides, Bismaleimides, Cyanate esters, polycyanurates, Furan, Silicone resins, Thiolyte and Vinyl ester resins or a mixture thereof.

Preferably, the molar mass distribution of the polymer is below or equal to 1300 and advantageously between 700 and 1200.

Preferably, the non-conductive substrate is a textile or a plastic substrate. In particular, the textile is a geomembrane, a geotextile or a geosynthetic clay liner. Preferably, the geomembrane, the geotextile or the geosynthetic clay liner are woven or non-woven.

In a preferred embodiment, the plastic substrate is chosen from among: Poly(methyl methacrylate), Acrylonitrile Butadiene Styrene, Polyamides family, Policarbonate, Polyvinyl chloride, Polypropylene, Polyethylene and Polyethylene terephthalate or a mixture thereof.

Preferably, the plastic substrate does not comprise Poly-4-vinylphenol, polyethersulfone or Polydimethylsiloxane. Indeed, without willing to be bound by any theory, it is believed that the presence of these polymers can reduce the detection sensitivity.

Advantageously, the paint does not comprise titanium dioxide or copper. Preferably, the non-conductive substrate is coated with paint strips to form an alternation between painted and non-painted non-conductive substrate.

In another embodiment, the non-conductive substrate is coated with one entire layer of paint.

The second object of the present invention is a method for the manufacture of the non-conductive substrate being at least partially coated according to the present invention, comprising the successive following steps:
A. mixing of reduced graphene oxide, a thermosetting monomer, a curing agent and optionally a solvent,
B. deposition of the mixture on a non-conductive substrate and
C. a curing step.

Preferably, in step B), the mixing is performed as follows:
i. mixing of reduced graphene oxide having a surface area below 300 $m^2 \cdot gr^{-1}$ and a thermosetting base polymer and optionally a solvent,
ii. addition of a curing agent,
iii. mixing of the mixture obtained in step B).

Preferably, in step A), the solvent is chosen from among others: xylene, n-butanol, ethylbenzene, naphtha, n-butyl acetate, toluene, cyclic hydrocarbons, isopropanol and benzyl alcohol or a mixture thereof.

Preferably, in step A), the thermosetting monomer is chosen from: epoxy resin, ester, urethane, urea/polyurethane, Vulcanized rubber, Urea-formaldehyde, Melamine resin, Benzoxazines, imides, Bismaleimides, Cyanate esters, cyanurates, Furan, Silicone resins, Thiolyte and Vinyl ester resins or a mixture thereof.

Advantageously, in step A), the curing agent is chosen from among: polyamide, phenols, amines and polyaddition isocyanate or a mixture thereof.

Preferably, in step B), the deposition of the coating is performed by spin coating, spray coating, dip coating, film coating, coil coating, brush coating or spatula coating.

Preferably, in step C), the curing step is performed by drying at room temperature.

The third object of the present invention is a method for detecting a leak with the non-conductive substrate being at least partially coated according to the present invention comprising the following successive steps:
a) application of an electric voltage to the non-conductive substrate being at least partially coated using an electronic system,
b) detection of a leak when the electrical circuit is formed in the non-conductive substrate being at least partially coated.

Figure 3A:
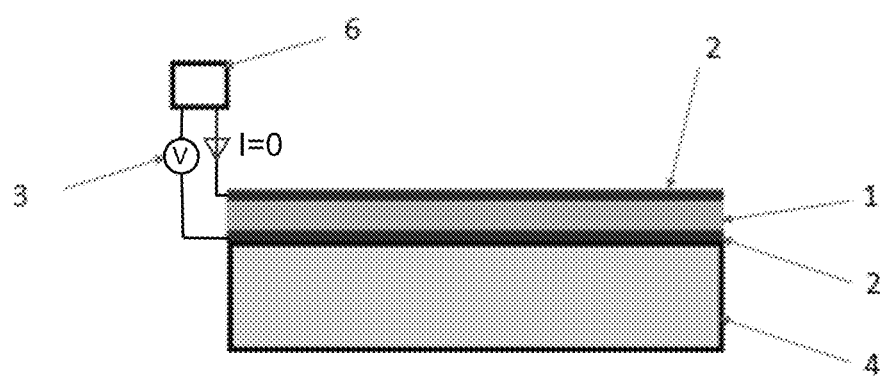
FIGS. 3a and 3b illustrate an example of a leak detection.
Figure 3B:
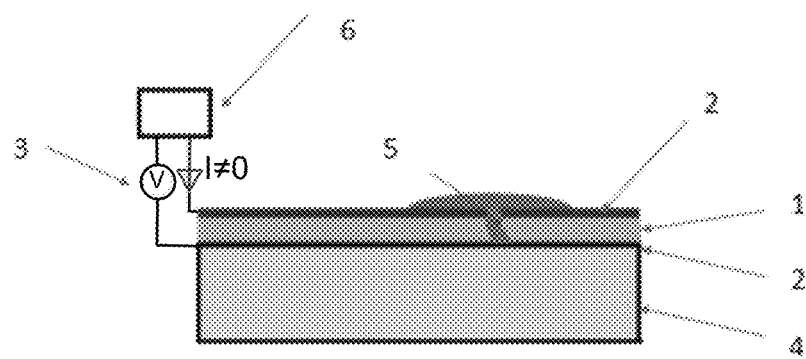

Without willing to be bound by any theory, it is believed that as illustrated in FIGS. 3a and 3b, when the coated non-conductive substrate detects a leak, an electrical circuit is formed. Indeed, it seems that initially, the non-conductive substrate 1 coated with the paint 2 forms an open electrical circuit even with the application of an electric voltage applied by a voltage source 3. The coated non-conductive substrate is for example deposited on mining waste 4. When there is a leak 5, a conductive fluid (e.g. water) comes into contact with the paint 2 present on the non-conductive substrate 1 and close the circuit. Then, an emitter 6 indicates the leak.

Preferably, in step I), the electronic system comprises a power supply system and an emitter able to indicate the leak. For example, the power supply system is a battery. Preferably, the emitter is a light. Preferably, in step II), the light is a light emitting diode (LED). In this case, when the electrical circuit is closed as the leak is formed, the electronic system turns on the LED. Alternatively, the emitter is a computer able to indicate the leak by showing a map with the area affected by the leak.

The fourth object of the present invention is a method for detecting a strain deformation with the non-conductive substrate being at least partially coated according to the present invention comprising the following successive steps:
1. the application of an electric voltage to the non-conductive substrate being at least partially coated using an electronic system,
2. the measurement of the electrical resistance variation of the non-conductive substrate being at least partially coated.

Without willing to be bound by any theory, it is believed that in the paint, the reduced graphene oxide nanoparticles form a conductive network. When the material is subjected to a strain, the internal geometry of the network which is stronger than the thermosetting changes in an important way. The consequence is a change in the electrical resistance of the paint.

In this case, preferably, the gauge factor, being the ratio of relative change in electrical resistance to the mechanical strain c, is above 5.

Preferably, in step 1), the electronic system comprises a power supply system. Preferably, it is a battery.

Finally, the last object of the present invention is the use of a non-conductive substrate being at least partially coated according to the present invention for detecting leak or strain deformation.

The invention will now be explained in trials carried out for information only. They are not limiting.

EXAMPLES

Example 1: Conductivity Test

Different nanoparticles were mixed with an epoxy resin having a molar mass distribution between 700 and 1200, bisphenol A-(epichlorhydrin) epoxy resin having a molar mass distribution below or equal to 700 and xylene. The mixture was mixed and dispersed using a device called DISPERMAT. Then, a curing agent comprising polyamide was added in the mixture before being mixed. The mixture was deposited on poly(methylmethacrylate) (PMMA) substrate.

Then, an electric voltage (10V) was applied on all the trials using an electronic system including a battery. The electrical resistance was determined. The surface area was measured by Brunauer-Emmett-Teller (BET). The conductivity of all Trials was calculated.

The results are in the following Table 1:

| Trials | Nanoparticles | | | | Nanoparticles Concentration in the paint (wt. %) | Sheet Resistance ($\Omega$/sq) | Minimum Conductivity (S/m) |
|---|---|---|---|---|---|---|---|
| | Nature | Oxygen content (wt %) | Lateral size (μm) | Surface area (m$^2$/gr) | | | |
| 1* | Reduced Graphene oxide (rGO) | Between 2 and 2.5 | Around 70 | 287 | 0.5 | $2.7 \times 10^6$ | $3.7 \times 10^{-3}$ |
| 2* | rGO | Between 2 and 2.5 | Around 70 | 287 | 0.75 | $6.7 \times 10^4$ | $1.5 \times 10^{-1}$ |
| 3* | rGO | Between 2 and 8 | Around 70 | 287 | 0.5 | $3.6 \times 10^8$ | $2.8 \times 10^{-5}$ |
| 4* | rGO | Between 2 and 10 | Around 30 | 287 | 0.6 | $4.8 \times 10^{10}$ | $2.1 \times 10^{-7}$ |
| 5 | graphene | <2 | >5 | — | 0.5 | $>10^{12}$ | $<1 \times 10^{-8}$ |
| 6 | graphene | <2 | >5 | — | 0.75 | $>10^{12}$ | $<1 \times 10^{-8}$ |

*according to the present invention.

Trials 1 to 4 show a high conductivity and therefore a high sensitivity for detecting leak and strain deformation compared to Trials 5 and 6.

Example 2: Leak Detection Test

Nanoplatelets of Reduced graphene oxide having from 1 to 5% by weight oxygen and a lateral size around 20 μm was mixed with epoxy resin having a molar mass distribution between 700 and 1200, bisphenol A-(epichlorhydrin) epoxy resin having a molar mass distribution below or equal to 700 and xylene. A solvent comprising xylene, n-butanol, ethylbenzene and naphtha was added. The mixture was mixed and dispersed using a device called DISPERMAT. Then, a curing agent comprising polyamide was added in the mixture before being mixed. The mixture was deposited on a non-woven geotextile made of polyethylene terephthalate (PET). Then, drying was performed at room temperature.

The coated geotextile was perforated to create a small hole and then it was positioned between two layers of mining wastes. An electronic system, comprising a battery and LEDs, was connected to the coated geotextiles. Water was poured on the top of the mining wastes. When the water flows through the hole in the coated geotextile, the electrical circuit is formed and the LEDs switch on.

The same test was performed by depositing paint strips to form a paint alternation on the geotextile. When water came into contact with the coated geotextile, the LEDs that switched on were the one closest to the geotextile in contact with water. Thus, if the geotextile is broad (i.e. hundreds of meters), it is possible to quickly see where the water leak happened thanks to the correlation between the position and the LEDs that are shining.

Example 3: Strain Deformation Test

Different nanoparticles were mixed with an epoxy resin having a molar mass distribution between 700 and 1200, bisphenol A-(epichlorhydrin) epoxy resin having a molar mass distribution below or equal to 700 and xylene. The mixture was mixed and dispersed using a device called DISPERMAT. Then, a curing agent comprising polyamide was added in the mixture before being mixed. The mixture was deposited on poly(methylmethacrylate) (PMMA) substrate.

Then, a tensile loading was applied on all the Trials and the gauge factor, being the ratio of relative change in electrical resistance, to the mechanical strain c, was determined. The surface area was measured by Brunauer-Emmett-Teller (BET). A conventional strain gauge sensitivity being made of Constantan® was added in comparison.

The results are in the following Table 2:

| Trials | Nanoparticles | | | | Nanoparticles Concentration in the paint (wt. %) | Strain (%) | Gauge factor |
|---|---|---|---|---|---|---|---|
| | Nature | Oxygen content (wt %) | Lateral size (μm) | Surface area (m$^2$/gr) | | | |
| 7* | rGO | Between 2 and 2.5 | Around 70 | 287 | 0.6 | 0.2 | 8 |
| 8* | rGO | Between 2 and 2.5 | Around 70 | 287 | 0.6 | 0.4 | 27 |
| 9* | rGO | Between 2 and 2.5 | Around 70 | 287 | 0.6 | 0.6 | 27 |
| 10* | rGO | Between 2 and 2.5 | Around 70 | 287 | 0.6 | 0.8 | 30 |
| 12 | conventional strain gauge | — | — | — | — | 0.2 | 2 |

-continued

| Trials | Nature | Nanoparticles Oxygen content (wt %) | Lateral size (μm) | Surface area (m$^2$/gr) | Nanoparticles Concentration in the paint (wt. %) | Strain (%) | Gauge factor |
|---|---|---|---|---|---|---|---|
| 13 | conventional strain gauge | — | — | — | — | 0.4 | 2 |
| 14 | conventional strain gauge | — | — | — | — | 0.6 | 2 |
| 15 | conventional strain gauge | — | — | — | — | 0.8 | 2 |

*according to the present invention.

Trials 7 to 10 show a high gauge factor and therefore a high sensitivity to detect the strain deformation compared to conventional strain gauge.

What is claimed is:

1. A coated non-conductive substrate comprising:
a non-conductive substrate being at least partially coated on at least one side with a paint including a reduced graphene oxide having a surface area below 300 m$^2$·gr$^{-1}$ and at least one thermosetting polymer, the non-conductive substrate being directly coated by the paint.

2. The coated non-conductive substrate as recited in claim 1 wherein a lateral size of the reduced graphene oxide is between 1 and 80 μm.

3. The coated non-conductive substrate as recited in claim 1 wherein a weight percentage of oxygen in the reduced graphene oxide is between 2 and 20%.

4. The coated non-conductive substrate as recited in claim 1 wherein a concentration of the reduced graphene oxide in the paint is between 0.05 and 10% by weight.

5. The coated non-conductive substrate as recited in claim 1 wherein the thermosetting polymer is chosen from at least one of the group consisting of: epoxy resin, Polyester resin, Polyurethanes, Polyurea/polyurethane, Vulcanized rubber, Urea-formaldehyde, Melamine resin, Benzoxazines, Polyimides, Bismaleimides, Cyanate esters, polycyanurates, Furan, Silicone resins, Thiolyte and Vinyl ester resins and a mixture thereof.

6. The coated non-conductive substrate as recited in claim 1 wherein the non-conductive substrate is a textile or a plastic substrate.

7. The coated non-conductive substrate as recited in claim 1 wherein the non-conductive substrate is coated with paint strips to form an alternation between painted non-conductive substrate and non-painted non-conductive substrate.

8. A method for manufacture of the coated non-conductive substrate as recited in claim 1, the method comprising the successive following steps:
A. mixing the reduced graphene oxide having a surface area below 300 m$^2$·gr$^{-1}$, a thermosetting monomer, a curing agent and optionally a solvent;
B. depositing the mixture on the non-conductive substrate; and
C. curing the mixture.

9. The method as recited in claim 8 wherein in step A), the solvent is chosen from at least one of the group consisting of: xylene, n-butanol, ethylbenzene, naphtha and a mixture thereof.

10. The method as recited in claim 8 wherein in step A), the curing agent is chosen from at least one of the group consisting of: polyamide, polyamide, phenols, amines and polyaddition isocyanate and a mixture thereof.

11. A method for detecting a leak with the coated non-conductive substrate as recited in claim 1, the method comprising the following successive steps:
applying an electric voltage to the coated non-conductive substrate using an electronic system; and
detecting a leak when an electrical circuit is formed in the coated non-conductive substrate.

12. The method as recited in claim 11 wherein the electronic system includes a power supply system and an emitter capable of indicating the leak.

13. A method for detecting a strain deformation with the coated non-conductive substrate as recited in claim 1, the method comprising the following successive steps:
applying an electric voltage to the coated non-conductive substrate using an electronic system; and
measuring an electrical resistance variation after deformation of the coated non-conductive substrate.

14. The method as recited in claim 13 wherein the electronic system includes a battery and a power supply system.

15. The coated non-conductive substrate as recited in claim 1, wherein
the non-conductive substrate is a geomembrane, a geotextile or a geosynthetic clay liner,
the reduced graphene oxide is in the form of nanoplatelets,
the lateral size of the reduced graphene oxide is between 40 and 80 μm, and
the weight percentage of oxygen in the reduced graphene oxide is between 2 and 10%, and the concentration of reduced graphene oxide in the paint is between 0.5 and 4% by weight.

16. The coated non-conductive substrate as recited in claim 2 wherein a lateral size of the reduced graphene oxide is between 60 and 80 μm.

17. The method as recited in claim 8 wherein
the non-conductive substrate is the geomembrane, the geotextile or the geosynthetic clay liner,
the reduced graphene oxide is in the form of nanoplatelets,
the lateral size of the reduced graphene oxide is between 40 and 80 μm,
the weight percentage of oxygen in the reduced graphene oxide is between 2 and 10%, and
the concentration of reduced graphene oxide in the deposited paint is between 0.5 and 4% by weight.

18. The coated non-conductive substrate as recited in claim 1, wherein the reduced graphene oxide has a surface area below 290 m$^2$·gr$^{-1}$.

19. The coated non-conductive substrate as recited in claim 1, wherein the reduced graphene oxide has a surface area above 200 m$^2$·gr$^{-1}$ and below 290 m$^2$·gr$^{-1}$.

20. The method as recited in claim 8, wherein the reduced graphene oxide has a surface area below 290 $m^2 \cdot gr^{-1}$.

21. The method as recited in claim 8, wherein the reduced graphene oxide has a surface area above 200 $m^2 \cdot gr^{-1}$ and below 290 $m^2 \cdot gr^{-1}$.

* * * * *